(12) United States Patent
Ottavi

(10) Patent No.: US 10,722,075 B2
(45) Date of Patent: Jul. 28, 2020

(54) COFFEE GRINDER WITH VARYING SPEED

(71) Applicant: SIMONELLI GROUP S.P.A., Belforte del Chienti (MC) (IT)

(72) Inventor: Nando Ottavi, Cessapalombo (IT)

(73) Assignee: SIMONELLI GROUP S.P.A., Belforte del Chienti (MC) (IT)

( * ) Notice: Subject to any disclaimer, the term of this patent is extended or adjusted under 35 U.S.C. 154(b) by 250 days.

(21) Appl. No.: 15/764,490

(22) PCT Filed: Sep. 29, 2016

(86) PCT No.: PCT/EP2016/073236
§ 371 (c)(1),
(2) Date: Mar. 29, 2018

(87) PCT Pub. No.: WO2017/055433
PCT Pub. Date: Apr. 6, 2017

(65) Prior Publication Data
US 2018/0279831 A1    Oct. 4, 2018

(30) Foreign Application Priority Data

Oct. 1, 2015  (IT) .................. 102015000057426

(51) Int. Cl.
*A47J 42/44*    (2006.01)
*A47J 42/38*    (2006.01)
*A47J 42/50*    (2006.01)

(52) U.S. Cl.
CPC ............... *A47J 42/44* (2013.01); *A47J 42/38* (2013.01); *A47J 42/50* (2013.01)

(58) Field of Classification Search
CPC .. A47J 42/44; A47J 42/38; A47J 42/50; A47J 42/42; A47J 42/26; A47J 42/46
See application file for complete search history.

(56) References Cited

U.S. PATENT DOCUMENTS

| | | | | |
|---|---|---|---|---|
| 5,405,096 | A * | 4/1995 | Seol .................... | A47J 19/027 241/282.1 |
| 5,992,775 | A * | 11/1999 | Wingler .................... | B02C 7/11 241/261.2 |
| 7,874,505 | B1 * | 1/2011 | Lassota .................... | A47J 42/38 241/259.1 |
| 8,256,696 | B1 * | 9/2012 | Lassota .................... | A47J 42/38 241/36 |
| 8,297,545 | B1 * | 10/2012 | Lassota .................... | A47J 42/38 241/100 |
| 2016/0058244 | A1 * | 3/2016 | Laffi ........................ | A47J 31/42 99/286 |

* cited by examiner

*Primary Examiner* — Faye Francis
(74) *Attorney, Agent, or Firm* — Egbert, McDaniel & Swartz, PLLC

(57) ABSTRACT

Coffee grinder including a grinding assembly to grind coffee beans, a container or hopper to feed coffee beans to the grinding assembly, an electric motor connected to the grinding assembly, a feeding conduit connected to the grinding assembly to feed coffee into a filter supported by a filter-holder, an inverter connected to the electric motor to vary the speed of the electric motor, a control unit connected to the inverter to control the inverter, and a control panel connected to the inverter by the control unit so that the user can vary the speed of the electric motor.

15 Claims, 1 Drawing Sheet

COFFEE GRINDER WITH VARYING SPEED

Figure 1:
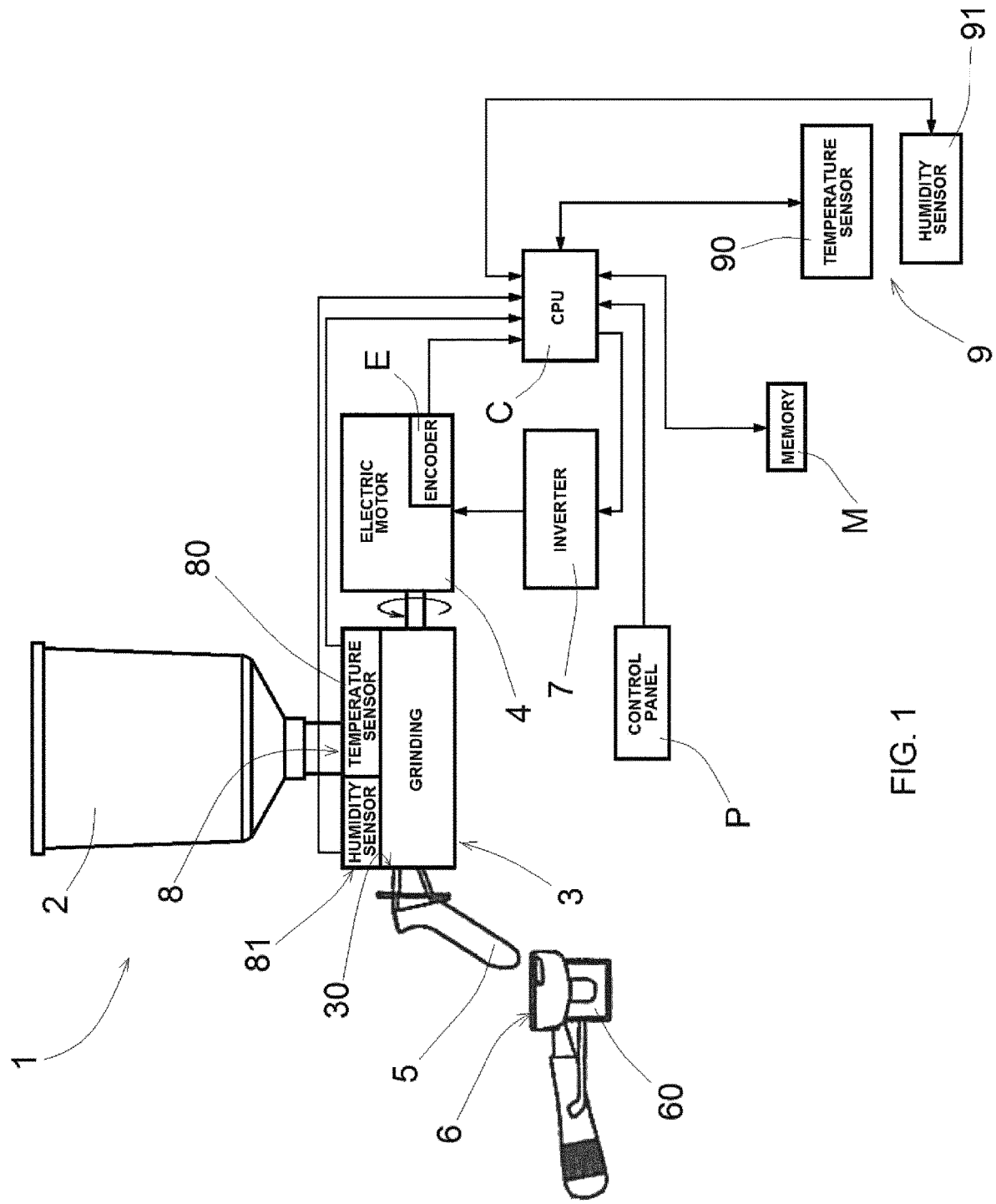

The present patent application for industrial invention relates to a coffee grinder provided with a varying speed motor.

As it is known, a professional coffee machine uses a filter-holder with a filter that must be filled with one dose or two doses or multiple doses of ground coffee. Two conditions are necessary to ensure that the coffee made with the coffee machine will preserve its organoleptic features:

coffee must be ground from beans immediately before being made; and the quantity of ground coffee in the filter-holder must comply with a preset weight value according to the dose or the doses.

In fact, with the passing of time ground coffee will lose its aroma; moreover, doses with little ground coffee or with too much ground coffee will originate a poorly balanced drink.

In order to solve these drawbacks at least partially, coffee grinders are known, which comprise a grinding assembly actuated by an electric motor to grind coffee beans that are fed from a container or a hopper in order to feed ground coffee inside the filter.

This type of coffee grinders generally comprises a button that can be manually pressed by an operator to actuate the electric motor and the grinding assembly in order to supply ground coffee.

However such coffee grinders are impaired by some drawbacks.

As a matter of fact, the quantity of ground coffee supplied in the filter is empirically regulated by the operator, who interrupts the supply of ground coffee according to his or her experience as soon as he or she believes that an exact dose of ground coffee has been supplied. Evidently, such an empirical regulation is easily impaired by mistakes and is often too approximate to ensure the supply of an exact dose of coffee.

Automatic coffee grinders are known, wherein a preset actuation time of the motor of the grinding assembly, and consequently a supply time of ground coffee, is saved. Evidently, with such a type of coffee grinders, the operator is no longer responsible of the correct supply of ground coffee; however, these coffee grinders tend to be inefficient and inexact because of a plurality of factors able to affect the quantity of coffee supplied during the actuation time of the motor of the grinding assembly. These factors can be the wear of the blades, the friction between the blades and the coffee, the cleanness of the coffee grinder, the hardness and the dimensions of the coffee beans.

WO2014075828 discloses an automatic coffee machine having a coffee grinder with an electric motor provided with power-limiting means that limit the motor power according to the motor temperature. However, such a machine cannot avoid jamming the grinding assembly.

AU2014100881 discloses a coffee grinder having a stepper motor that regulates the distance of the blades and therefore the grain size of the ground coffee.

DE102004035459 discloses a coffee grinder having a varying speed motor with the purpose of ejecting the residues of ground coffee by means of the centrifugal force in order to clean the grinding chamber.

Such documents of the prior art disclose coffee grinders that grind coffee at a constant speed that is set by the factory and cannot be varied by the operator. None of the prior documents discloses the possibility of varying the speed of the electric motor of the coffee grinder in order to improve the quality of ground coffee.

WO96/23437 discloses a machine for American style coffee comprising a coffee grinder with a grinding blade to grind coffee beans, a container intended to receive the coffee beans to be ground, and an electric motor with varying speed connected to the grinding blade. However such a prior document does not describe the possibility for the user to vary the speed of the electric motor according to the specific requirements.

The purpose of the present invention is to overcome the drawbacks of the prior art by disclosing a coffee grinder able to guarantee a good quality of the ground coffee according to the work load.

Another purpose of the present invention is to disclose such a coffee grinder that is precise and reliable and ensures the supply of a correct dose of ground coffee.

These purposes are achieved by the present invention with the characteristics claimed in the independent claim 1.

Advantageous embodiments will appear from the dependent claims.

After making several experimental tests the applicant found out that the quality of the coffee extracted by a coffee machine strongly depends on the grinding speed of the grinding assembly. The slower coffee is ground, the better its organoleptic features are preserved because coffee overheating is avoided at a low speed. Evidently, the operation of the coffee grinder at a low speed takes a long time and therefore the grinding speed must be subordinated to the work load, that is to say to the number of customers who want coffee.

Starting from these considerations the applicant devised the coffee grinder of the invention, which comprises:

a grinding assembly intended to grind coffee beans, a container or hopper to feed the coffee beans to the grinding assembly, an electric motor connected to the grinding assembly in order to actuate or stop said grinding assembly; and a feeding conduit connected to the grinding assembly to feed coffee inside a filter supported by a filter-holder;

an inverter connected to the electric motor to vary the speed of the electric motor, and a control unit connected to the inverter to control the inverter.

The peculiarity of the coffee grinder according to the present invention consists in the fact that it also comprises a control panel connected to the inverter by means of the control unit in such manner that the user can vary the speed of the electric motor.

The hardness and the viscosity of coffee beans are different according to the coffee blend because they depend on the toasting process and on the quality and origin of coffee in the blend. Therefore every blend of ground coffee has its preferred grain size. Moreover, the applicant found out that also the grain size of the coffee varies upon varying the grinding speed. At the same fineness, the grain size curve of coffee grinding depends on the grinding speed because the permanence time in the grinding chamber varies with the grinding speed. Therefore, different grain size curves are obtained at varying speeds. In order to obtain a higher percentage of fine particles, coffee must be ground at a low speed (less than 800 rpm). On the contrary, in order to obtain a higher percentage of large particles, the speed must be increased. With the same coffee blend, the variation of the grain size curve depends on the variation of the grinding speed. Consequently, a different result is obtained when making liquid coffee for each grain size curve (which corresponds to a certain speed curve). The good taste and quality of coffee extraction depend on the grain size curve that corresponds to the rotational speed curve of the electric motor.

In view of the above the applicant implemented the possibility for the operator to create and save different speed curves of the electric motor, which correspond to the desired grain size and to the specific coffee blend used.

Therefore the coffee grinder also comprises a memory that is used to save the rotational speed curves of the electric motor that correspond to the desired grain size of the ground coffee, according to the type of grinding and to the coffee blend. Such a memory is connected to the inverter by means of the control unit so that the electric motor can follow a certain rotational speed curve, which is set by the user with the control panel, according to the desired grain size and/or to the coffee blend.

It must be considered that coffee absorbs more or less humidity according to the temperature and humidity in the air. This affects the chemical-physical parameters of the blend, such as hardness, viscosity and dielectric. Therefore, with the same grinding time, these parameters affect the quantity of ground coffee that comes out (dose) and its organoleptic features.

Thanks to the provision of the inverter and of the electric motor that allow to vary the grinding speed, the effects of the different starting conditions will be compensated in order to obtain the same quantity of ground coffee and the same organoleptic features in the coffee extracted in the cup.

It must be considered that the quality of coffee also depends on environmental conditions, such as temperature and humidity.

In fact, when high temperatures are reached by coffee in the grinding chamber (according to the operation time of the machine and to the external temperature):
  the oils and substances that are contained in coffee tend not to maintain their chemical features stable, oxidizing the oils and converting the oils in other chemical substances, which make coffee grow rancid;
  the most volatile components that are contained in the coffee blend tend to abandon the blend and evaporate in the air.

Therefore, if the blend is heated beyond a certain value, in order to obtain a good grinding quality and consequently a cup of coffee with good organoleptic properties, the grinding speed (which reduces the generation of heat) must be decreased.

To that purpose, the coffee grinder of the invention advantageously comprises ambient sensors disposed in the grinding chamber and/or in the external environment and connected to the control unit to control the rotational speed according to the values detected by the environmental sensors.

Advantageously, the coffee grinder of the invention comprises an encoder disposed in the electric motor to count the number of revolutions of the electric motor. In such a way, the dose of ground coffee can be controlled in a very exact way, according to the number of revolutions made by the electric motor, regardless of the grinding time and of the weight of ground coffee.

Additional features of the invention will appear evident from the detailed description below, which refers to a merely illustrative, not limiting embodiment, as illustrated in the attached figures, wherein:

FIG. 1 is a diagrammatic view showing the parts of a coffee grinder according to the invention.

With reference to FIG. 1, a coffee grinder according to the present invention is disclosed, which is globally indicated with reference numeral (1).

The coffee grinder (1) comprises a container or hopper (2) to feed coffee beans to a grinder assembly (3) intended to grind the coffee beans in a grinding chamber (30). An electric motor (4) is connected to the grinding assembly (3) in such manner to actuate or stop the grinding assembly (3). A feeding conduit (5) is connected to the grinding assembly (3) to feed ground coffee inside a filter (6) supported by a filter-holder (60).

When the electric motor (4) is actuated, the coffee beans are ground by the grinder assembly (3) and the ground coffee is supplied by the feeding conduit (5). When the electric motor (4) is stopped, the feeding of ground coffee from the feeding conduit (5) is interrupted.

The electric motor (4) is a three-phase asynchronous motor. The electric motor (4) is connected to an inverter (7) intended to vary the rotational speed of the electric motor (4), which is indicative of the grinding speed of the coffee. The inverter (7) is an inverter with single-phase power supply and three-phase output connected to the electric motor. The frequency and the effective voltage of the inverter are adjustable in order to adjust the rotational speed of the electric motor. The electric motor (4) has a rotational speed that can vary from 0 to the maximum attainable technical value.

A control unit (C) is connected to the inverter to control the inverter. A control panel (P) is connected to the control unit (C). In such a way, by means of the control panel (P) the user can control the rotational speed of the electric motor (4) manually according to the work load and the productivity to be obtained, either increasing or decreasing the time used to obtain a dose of ground coffee.

For example, in presence of many customers, in order to increase productivity, the operator will actuate the electric motor at a speed higher than 1200 rpm to grind one dose in less than 5 seconds. On the contrary, in presence of a few customers, in order to increase quality, the operator will actuate the electric motor at a speed lower than 800 rpm to grind one dose in more than 6 seconds, thus improving the quality of ground coffee.

The coffee grinder (1) also comprises a memory (M) connected to the control unit (C). A plurality of rotational speed curves that can be executed by the electric motor (4) is saved in the memory (M). Every speed curve corresponds to a certain grain size of the ground coffee, which is obtained by making the electric motor (4) operate with that specific speed curve. The speed curves are chosen by the user, by means of the control panel (P), according to the type of grain size to be obtained and/or according to the type of coffee blend.

The coffee grinder (1) also comprises:
  a first set of environmental sensors (8) disposed in the grinding chamber (30) to detect the environmental conditions in the grinding chamber (30), and
  a second set of environmental sensors (9) disposed outside the coffee grinder (1) to detect the environmental conditions outside the coffee grinder (1).

The first and the second set of environmental sensors (8, 9) comprise temperature sensors (80, 90) and/or humidity sensors (81, 91).

The first and the second set of environmental sensors (8, 9) are connected to the control unit (C).

The memory (M) is used to save threshold environmental values, such as temperature values and/or humidity values of the grinding chamber (30) and/or of the external environment, which are the maximum values above which coffee can be deteriorated. The control unit (C) is set in such manner to compare the environmental values detected by the sets of sensors (8, 9) with the threshold environmental values saved in the memory (M). If the environmental values detected by the set of sensors (8, 9) exceed the threshold values, the control unit (C) controls the inverter (7) in order to decrease the rotational speed of the motor (4) so that the environmental values detected by the sets of sensors (8, 9) are maintained under the threshold values saved in the memory.

The coffee grinder (1) also comprises an encoder (E) disposed in the electric motor (4) to count the number of revolutions that are made by the electric motor (4). The exact number of revolutions made by the electric motor (4) to grind one dose is saved in the memory (M).

The encoder (E) is connected to the control unit (C) that is configured in such manner to compare the number of revolutions counted by the encoder (E) with the number of revolutions saved in the memory. When the number of revolutions counted by the encoder reaches the number of revolutions saved in the memory, the control unit immediately stops the electric motor (4) because the exact quantity of one dose has been reached, regardless of the grinding time or of the weight of the dose.

It must be considered that the control unit (C) can be set in such manner to control the inverter (7) in order to invert the rotational direction of the electric motor (4).

The control unit (C) is connected to the inverter (7) and is set in such manner to detect the power absorption rate of the electric motor (4). If such a power absorption rate is higher than a threshold value saved in the memory (M), this indicates an anomalous stress of the motor or the blocking of the grinding assembly (3). In this case, when the power absorbed by the motor exceeds a threshold value, the control unit (C) inverts the rotation of the electric motor (4) to avoid downtime, motor damage, high consumptions and the action of a specialized technician.

Moreover, the control unit (C) is set in such manner that, when grinding is started, the electric motor (4) makes an angle of rotation in inverse direction compared to the direction of rotation used for grinding, thus avoiding stopping the grinding assembly (3) at the start, facilitating the acceleration of the motor (4), and reducing the starting torque.

The invention claimed is:

1. A coffee grinder comprising:
a grinding chamber;
a grinding assembly disposed in said grinding chamber, said grinding assembly adapted to grind coffee beans;
a hopper connected to said grinding assembly and adapted to feed the coffee beans to said grinding assembly;
an electric motor connected to said grinding assembly so as to actuate said grinding assembly or to stop said grinding assembly in order to grind one coffee dose;
a feeding conduit connected to said grinding assembly and adapted to feed ground coffee beans to a filter that is supported by a filter holder;
an inverter connected to said electric motor so as to vary a speed of said electric motor;
a control unit connected to said inverter in order to control said inverter;
a control panel connected to said inverter via said control unit, said control panel adapted to allow a user to vary the speed of said electric motor; and
a memory connected to said control unit, said memory storing a plurality of rotational speed curves of said electric motor, each rotational speed curve of the plurality of rotational speed curves corresponding to a preset grain size of the ground coffee, said control unit adapted to allow the user to select one of the plurality of rotational speed curves through said control panel.

2. The coffee grinder of claim 1, further comprising:
an encoder disposed in said electric motor so as to count a number of rotations of a shaft of said electric motor, said control unit controlling said inverter so as to stop the rotation of the shaft of said electric motor when the number of rotations counted by said encoder reaches a preset number of rotations for the one coffee dose.

3. The coffee grinder of claim 1, wherein said control unit controls said inverter in order to invert a rotational direction of a shaft of said electric motor.

4. The coffee grinder of claim 3, wherein said control unit is connected to said inverter so as to detect a power absorption rate of said electric motor and to control said inverter so as to invert the rotation of the shaft of said electric motor when a power absorption rate is detected that is greater then a preset threshold value.

5. The coffee grinder of claim 3, wherein said electric motor makes an angle of rotation when grinding starts that is in an inverse direction to a grinding rotational direction.

6. The coffee grinder of claim 1, wherein in said electric motor is a three-phase synchronous motor, said inverter having a single-phase power supply and a three phase output connected to said electric motor, said inverter having an adjustable frequency and an effective voltage so as to adjust the speed of said electric motor.

7. A coffee grinder comprising:
a grinding chamber;
a grinding assembly disposed in said grinding chamber, said grinding assembly adapted to grind coffee beans;
a hopper connected to said grinding assembly and adapted to feed the coffee beans to said grinding assembly;
an electric motor connected to said grinding assembly so as to actuate said grinding assembly or to stop said grinding assembly in order to grind one coffee dose;
a feeding conduit connected to said grinding assembly and adapted to feed ground coffee beans to a filter that is supported by a filter holder;
an inverter connected to said electric motor so as to vary a speed of said electric motor;
a control unit connected to said inverter in order to control said inverter;
a control panel connected to said inverter via said control unit, said control panel adapted to allow a user to vary the speed of said electric motor; and
at least one set of environmental sensors disposed inside or outside said grinding chamber so as to detect environmental values inside or outside said grinding chamber, said at least one set of environmental sensors being connected to said control unit, said control unit controlling said inverter so as to vary the speed of said electric motor in accordance with the environmental values detected by said at least one set of environmental sensors.

8. The coffee grinder of claim 7, further comprising:
a memory having threshold environmental values stored therein, the threshold environmental values corresponding to an impaired state of the ground coffee, said control unit comparing the environmental values detected by said at least one set of environmental sensors with the threshold environmental values so as to reduce the speed of said electric motor when the environmental values detected by said at least one set of environmental sensors exceed the threshold environmental values stored in said memory.

9. The coffee grinder of claim 7, wherein said at least one set of environmental sensors comprising temperature sensors.

10. The coffee grinder of claim 7, wherein said at least one set of environmental sensors comprising humidity sensors.

11. The coffee grinder of claim 7, further comprising:
an encoder disposed in said electric motor so as to count a number of rotations of a shaft of said electric motor, said control unit controlling said inverter so as to stop the rotation of the shaft of said electric motor when the number of rotations counted by said encoder reaches a preset number of rotations for the one coffee dose.

12. The coffee grinder of claim 7, wherein said control unit controls said inverter in order to invert a rotational direction of a shaft of said electric motor.

13. The coffee grinder of claim 12, wherein said control unit is connected to said inverter so as to detect a power absorption rate of said electric motor and to control said inverter so as to invert the rotation of the shaft of said electric motor when a power absorption rate is detected that is greater then a preset threshold value.

14. The coffee grinder of claim 12, wherein said electric motor makes an angle of rotation when grinding starts that is in an inverse direction to a grinding rotational direction.

15. The coffee grinder of claim 7, wherein in said electric motor is a three-phase synchronous motor, said inverter having a single-phase power supply and a three phase output connected to said electric motor, said inverter having an adjustable frequency and an effective voltage so as to adjust the speed of said electric motor.

\* \* \* \* \*